US008713105B2

(12) United States Patent
Ramalingam et al.

(10) Patent No.: US 8,713,105 B2
(45) Date of Patent: Apr. 29, 2014

(54) METHOD AND APPARATUS FOR TRANSCODING AND TRANSRATING IN DISTRIBUTED VIDEO SYSTEMS

(75) Inventors: Thiyagesan Ramalingam, Milpitas, CA (US); Francis Paul Viggiano, Palo Alto, CA (US); Nermin Ismail, Fremont, CA (US); Walter Friedrich, Pleasanton, CA (US); Duanpei Wu, San Jose, CA (US); Shantanu Sarkar, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 7690 days.

(21) Appl. No.: 11/324,864

(22) Filed: Jan. 3, 2006

(65) Prior Publication Data

US 2007/0156924 A1 Jul. 5, 2007

(51) Int. Cl.
*G06F 15/16* (2006.01)
*H04N 7/26* (2006.01)
*H04N 7/15* (2006.01)

(52) U.S. Cl.
CPC ...... *H01L 12/1822* (2013.01); *H04N 19/00472* (2013.01); *H04N 7/15* (2013.01); *H04N 19/00078* (2013.01)
USPC ................ 709/205; 379/202.01; 707/104.1; 709/218

(58) Field of Classification Search
CPC .............................................. H04N 19/00472
USPC .................. 348/14.08, 14.09; 370/259–260, 370/270–271; 379/201.01, 202.01; 709/204–207, 246–247
See application file for complete search history.

(56) References Cited

U.S. PATENT DOCUMENTS 4,845,497 A  7/1989  Weick et al. ............... 341/75
5,007,046 A  4/1991  Erving et al.
(Continued)

FOREIGN PATENT DOCUMENTS

CA  2537944  11/2010
CN  1849824  10/2006
(Continued)

OTHER PUBLICATIONS

"Utility-Based Video Adaptation for Universal Multimedia Access (UMA) and Content-Based Utility Function Prediction for Real-Time Video Transcoding" Wang, Y.; Jae-Gon Kim; Chang, S.-F.; Shih-Fu Chang; Multimedia, IEEE Transactions on vol. 9, Issue 2, Feb. 2007 pp. 213-220.*

(Continued)

*Primary Examiner* — Andrew Goldberg
(74) *Attorney, Agent, or Firm* — Patent Capital Group

(57) ABSTRACT

Disclosed are video conferencing systems, devices, architectures, and methods for transcoding, transrating, and the like, to facilitate video streaming in a distributed arrangement. An exemplary translator in accordance with embodiments can include: an input configured to receive a first video stream in a first format, the first video stream being from a first media switch, the first media switch being associated with a first stream group having one or more first endpoints; and an output configured to provide a second video stream in a second format, the second video stream being sent to a second media switch, the second media switch being associated with a second stream group having one or more second endpoints, whereby the translator is configured to convert from the first to the second format. Further, the translator can be configured as a logical endpoint where a first interface having an input/output pair uses the first format and a second interface having another input/output pair uses the second format. The two formats may differ in at least one characteristic.

16 Claims, 12 Drawing Sheets

(56) References Cited

U.S. PATENT DOCUMENTS

| | | |
|---|---|---|
| 5,058,153 A | 10/1991 | Carew et al. |
| 5,541,852 A * | 7/1996 | Eyuboglu et al. ............. 709/232 |
| 5,600,646 A * | 2/1997 | Polomski ..................... 370/263 |
| 5,844,600 A | 12/1998 | Kerr |
| 5,848,098 A | 12/1998 | Cheng et al. |
| 5,914,940 A | 6/1999 | Fukuoka et al. |
| 5,953,049 A | 9/1999 | Horn et al. |
| 6,078,809 A | 6/2000 | Proctor |
| 6,128,649 A | 10/2000 | Smith et al. |
| 6,148,068 A | 11/2000 | Lowery et al. |
| 6,285,405 B1 | 9/2001 | Binford et al. |
| 6,300,973 B1 | 10/2001 | Feder et al. |
| 6,327,276 B1 | 12/2001 | Robert et al. |
| 6,463,414 B1 | 10/2002 | Su et al. ..................... 704/270.1 |
| 6,535,604 B1 | 3/2003 | Provencal et al. |
| 6,590,604 B1 | 7/2003 | Tucker et al. |
| 6,697,476 B1 | 2/2004 | O'Malley et al. ........ 379/202.01 |
| 6,741,250 B1 | 5/2004 | Furlan et al. |
| 6,989,856 B2 | 1/2006 | Firestone et al. |
| 7,257,641 B1 * | 8/2007 | VanBuskirk et al. ......... 709/238 |
| 7,477,282 B2 | 1/2009 | Firestone et al. |
| 2003/0048353 A1 | 3/2003 | Kenoyer et al. |
| 2003/0117486 A1 | 6/2003 | Ferren et al. |
| 2003/0149724 A1 | 8/2003 | Chang |
| 2003/0158900 A1 | 8/2003 | Santos |
| 2004/0008635 A1 | 1/2004 | Nelson et al. |
| 2004/0068648 A1 | 4/2004 | Lewis et al. |
| 2004/0193648 A1 * | 9/2004 | Lai et al. ..................... 707/104.1 |
| 2004/0263636 A1 | 12/2004 | Cutler |
| 2005/0071440 A1 * | 3/2005 | Jones et al. ................... 709/218 |
| 2005/0078170 A1 | 4/2005 | Firestone |
| 2005/0078172 A1 | 4/2005 | Harville |
| 2005/0237931 A1 | 10/2005 | Punj et al. |
| 2005/0237952 A1 | 10/2005 | Punj et al. |
| 2006/0087553 A1 * | 4/2006 | Kenoyer et al. ............ 348/14.08 |
| 2006/0092269 A1 | 5/2006 | Baird et al. |
| 2006/0136173 A1 | 6/2006 | Case et al. |
| 2006/0165083 A1 * | 7/2006 | Lee ................................ 370/392 |
| 2006/0209948 A1 * | 9/2006 | Bialkowski et al. ........ 375/240.2 |
| 2007/0002865 A1 * | 1/2007 | Burks et al. ................. 370/395.2 |
| 2007/0064901 A1 * | 3/2007 | Baird et al. .............. 379/202.01 |
| 2007/0153712 A1 | 7/2007 | Fry et al. |
| 2007/0156924 A1 | 7/2007 | Ramalingam et al. |
| 2007/0186002 A1 | 8/2007 | Campbell et al. |
| 2008/0273079 A1 | 11/2008 | Campbell et al. |
| 2009/0160929 A1 | 6/2009 | Wu et al. |

FOREIGN PATENT DOCUMENTS

| | | |
|---|---|---|
| EP | 1678951 | 7/2006 |
| EP | 1958443 | 8/2008 |
| JP | 2007124702 A * | 5/2007 |
| WO | WO 2005/036878 | 4/2005 |
| WO | WO 2007/067236 | 6/2007 |

OTHER PUBLICATIONS

"A system architecture for managing mobile streaming media services" Roy, S.; Covell, M.; Ankcorn, J.; Wee, S.; Yoshimura, T.; Distributed Computing Systems Workshops, 2003. Proceedings. 23rd International Conference on May 19-22, 2003 pp. 408-413.*

"Personalised multimedia services for real-time video over 3G mobile networks" Dogan, S.; Eminsoy, S.; Sadka, A.H.; Kondoz, A.M.; 3G Mobile Communication Technologies, 2002. Third International Conference on (Conf. Publ. No. 489) May 8-10, 2002 pp. 366-370.*

PCT International Preliminary Report on Patentability (1 page) and Written Opinion of the International Searching Authority (4 pages) mailed Apr. 10, 2007 for International Application No. PCT/US06/34729.

PCT International Preliminary Report on Patentability (1 page) and Written Opinion of the International Searching Authority (9 pages) mailed Apr. 10, 2006 for International Application PCT/US04/32977.

PCT international Search Report (1 page) mailed Apr. 10, 2007 for International Application No. PCT/US06/34729.

PCT International Search Report (1 page) mailed Feb. 28, 2005 for International Application No. PCT/US04/32977.

Fox Geoffrey, et al., "Design and Implementation of Audio/Video Collaboration System," Jan. 19, 2004, 6 pages [printed Jul. 28, 2011] http://grids.ucs.indiana.edu/ptliupages/publications/CTS-fina.pdf.

Handley, M., et al., "SDP: Session Description Protocol," Network Working Group, RFC 2327, Apr. 1998, 42 pages http://tools.ietf.org/pdf/rfc2327.pdf.

Holbrook, H., et al., "Source-Specific Multicast for IP," Internet-Draft, Sep. 7, 2004, 18 pages http://tools.ietf.org/pdf/draft-ietf-ssm-arch-06.pdf.

Rosenberg, J., et al., "SIP: Session Initiation Protocol," Network Working Group RFC 3261, Jun. 2002, 202 pages http://www.ietf.org/rfc/rfc3261.

Schulzrinne, H., et al., "RTP: A Transport Protocol for Real-Time Applications," Network Working Group RFC 3550, Jul. 2003, 89 pages; http://tools.ietf.org/pdf/rfc3550.pdf.

USPTO Jan. 12, 2012 Notice of Allowance from U.S. Appl. No. 11/961,710.

EPO Jun. 15, 2012 Supplementary European Search Report and Written Opinion from European Application EP06803048.

USPTO Sep. 21, 2011 Notice of Allowance from U.S. Appl. No. 11/295,384.

EPO Jan. 3, 2013 Response to EP Written Opinion from European Application EP06803048; 25 pages.

* cited by examiner

METHOD AND APPARATUS FOR TRANSCODING AND TRANSRATING IN DISTRIBUTED VIDEO SYSTEMS

BACKGROUND OF THE INVENTION

This invention is related in general to video conferencing systems and more specifically to devices, systems, architectures, and methods of using a transcoder and/or transrater device to facilitate video streaming in a distributed arrangement.

In conventional video conferencing, typically all of the video screens are active when the conference is in session in a "continuous presence" mode of operation. However, newer methods don't send a conference participant's media representation into the network unless they are, for example, the loudest talking speaker. Such approaches aim to save bandwidth across the network because not all of the participants need to be seen in the conference.

One drawback of many conventional approaches is that users with different client capabilities and/or bandwidths may not be allowed to join a video conference without the use of a transcoder and/or transrater. The format of a user's video stream may need to be converted (e.g., from one bit rate to another) in order to match another device on the network. Further, a transcoder and/or transrater used for such a conversion may be a relatively expensive video processing resource, such as a digital signal processor (DSP).

In a centralized multipoint control unit (MCU) type of system, such clients may be allowed to join a conference, but only using a compatible switch mode. If the client has an exclusive switch mode, the client would not be allowed to join the conference without a separate transcoder/transrater. However, this approach may not be feasible in a distributed MCU type of system. Accordingly, what is needed is an efficient and cost-effective way of including a transcoder/transrater or like function in a distributed video conferencing system.

DETAILED DESCRIPTION OF EMBODIMENTS OF THE INVENTION

Figure 1:
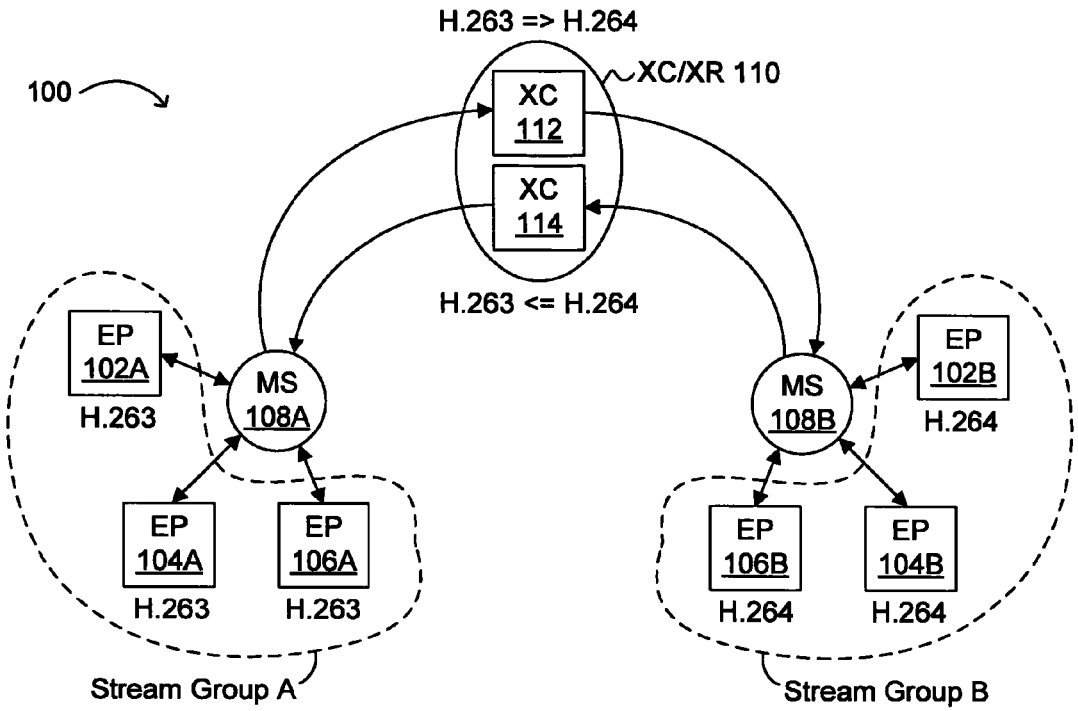
FIG. 1 is a block diagram illustrating an exemplary transcoder operation for two stream groups in accordance with embodiments of the present invention.

Embodiments of the present invention implement video conferencing architectures, structures, control systems, and/or methods for facilitating video streaming in a distributed arrangement. An exemplary system having devices and/or a structures in accordance with embodiments can include: (i) a first stream group including one or more first endpoints, the first stream group being associated with a first media switch, the first media switch being configured to receive and transmit a first video stream in a first format; (ii) a second stream group including one or more second endpoints, the first stream group being associated with a second media switch, the second media switch being configured to receive and transmit a second video stream in a second format; and (iii) a translator coupled between the first and second stream groups, the translator being configured to convert between the first and second formats. Further, the translator can be configured as a logical endpoint where a first interface having an input/output pair uses the first format and a second interface having another input/output pair uses the second format. The two formats may differ in at least one characteristic.

In general, any type of hardware, software or combination thereof can be used with aspects of embodiments of the invention. Further, any type of network and/or communication link can be used. Also, any type of media conferencing or the like, such as video and/or audio may be used with aspects of embodiments of the invention.

For clarity, various well-known components, such as power supplies, some or portions of communications ports, routers, gateways, firewalls, and so on, have been omitted from the figures. However, those skilled in the art with access to the present teachings will know which components to implement and how to implement them to meet the needs of a given application.

In general, a distributed multipoint control unit (MCU) architecture in accordance with embodiments of the present invention can include geographically distributed components instead of the more centralized conventional approach. In facilitating this decentralized approach, switch/routers or the like may be configured with software to operate as media switches. Media switch functionality can include locally terminating video endpoint media and distributing incoming video streams carried in real time protocol (RTP) packets based on conference policy, for example. Media can be forwarded between media switches and coordination between media switches can be provided by a controlling server.

A distributed video conferencing system in accordance with embodiments shows a previous speaker or a current speaker as determined by the loudest in the conference, for example. Alternatively, another speaker (i.e., not based on the loudest speaker) can be made the current speaker based on some conference policy, for example. In particular, the current speaker may be shown to all conference participants or "endpoints" on the network, except for the current speaker's monitor, which can show the previous speaker. Such approaches are typical in modern video conferencing systems (e.g., distributed conferences) in order to conserve bandwidth across the network because video content consumes substantially more bandwidth than does corresponding audio content.

Generally, aspects of embodiments of the present invention can allow for a sharing of transcoding/transrating video processing resources among all streams in a distributed video conference in a stream switch mode. This is advantageous in a video conferencing system to avoid problematic situations, such as: (i) some clients being disallowed from joining the conference; (ii) having a single relatively low quality video client affecting the user experience of relatively high quality video clients; and/or (iii) generally inefficient use of transcoder/transrater (e.g., DSP) resources. In one implementation, a savings of about 75% of the total number of DSPs required for transcoding/transrating functions in a distributed video conference can be realized.

Referring now to FIG. 1, a block diagram illustrating an exemplary transcoder operation in accordance with embodiments of the present invention is indicated by the general reference character 100. A transcoder may be an example of a translator. Further, a translator can include a transcoder, a transrater, a combined transcoder/transrater (e.g., a "translator"), or any suitable converter of a first format into a second format, where the two formats differ in at least one characteristic.

In FIG. 1, stream group A can include client types having or using common characteristics, such as the same encoder/decoder (codec) format, same bit rate, frame rate, same picture resolution, transportation carrying protocol or another such characteristic. A codec format can be a software-based support for real-time encoding and decoding of digital video streams. In the example of FIG. 1, stream group A can include H.263 codec format endpoints (EP) (e.g., endpoints using the H.263 codec format) 102A, 104A, and 106A. Further, media switch (MS) 108A can be associated with stream group A. Stream group B can include H.264 format codec EP 102B, 104B, and 106B. Similarly, MS 108B may be associated with stream group B. According to embodiments, a translator can be positioned to enable communication between clients or endpoints from stream groups A and B.

In this particular example, because the characteristic that differs between stream groups A and B is the codec format (e.g., H.263 versus H.264), a transcoder function may be utilized here. Typically, however, a transcoder can also include transrater as well. In this particular example, the transcoding function is highlighted. Transcoder/transrater (XC/XR) or translator 110 can be inserted essentially between stream groups A and B to allow the appropriate conversions that may be needed for high quality video communication. Video streams from MS 108A of stream group A in the H.263 codec format can be input to and converted in transcoder (XC) 112 (e.g., a first channel of translator 110) to the H.264 codec format suitable for clients in stream group B (e.g., via MS 108B). Similarly, video streams from MS 108B of stream group B in the H.264 codec format can be input to and converted in XC 114 (e.g., a second channel of translator 110) to the H.263 codec format suitable for clients in stream group A (e.g., via MS 108A). In this fashion, a transcoder resource can be shared for video stream paths between two separate stream groups.

Transrating can be defined as an implementation to transfer a video sequence stream to other streams that have the same video and transportation characteristics except for the bit rate. Since clients in the higher bit rate stream groups may be able to receive the streams from the lower bit rate stream groups, no transraters may be needed for the path from the lower to the higher bit rate stream group, thus potentially saving transrating resources in some applications.

Figure 2:
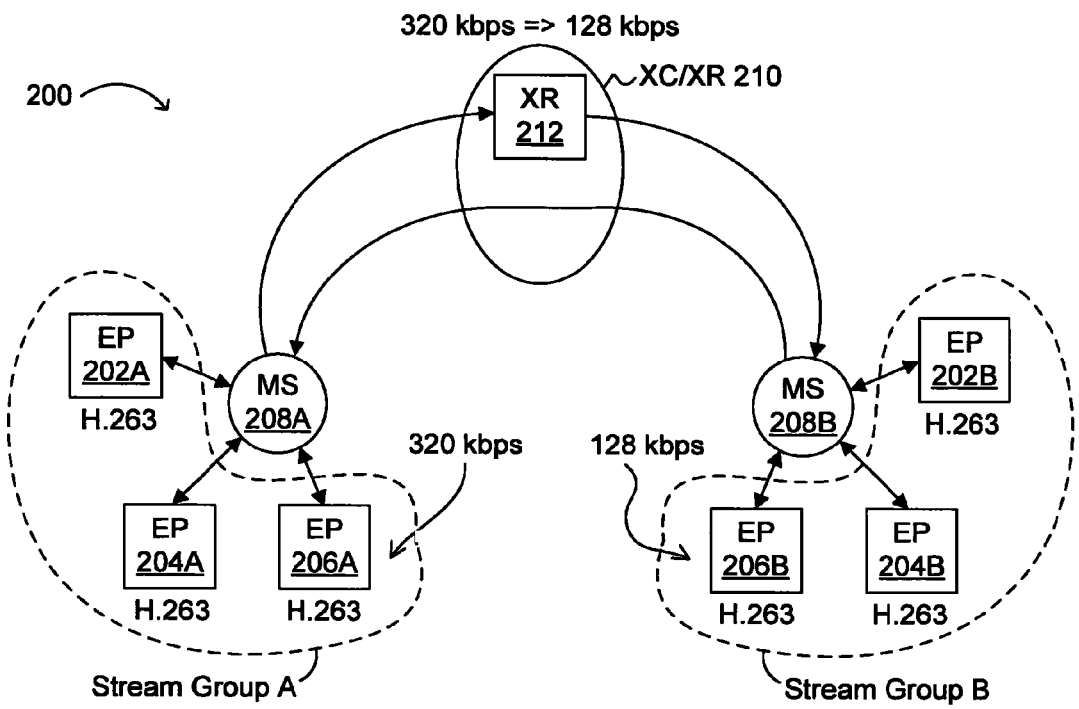
FIG. 2 is a block diagram illustrating an exemplary transrater operation in accordance with embodiments of the present invention.

Referring now to FIG. 2, a block diagram illustrating an exemplary transrater operation in accordance with embodiments of the present invention is indicated by the general reference character 200. Stream group A can include common bit rate (e.g., 320 kbps) clients EP 202A, 204A, and 206A, and may also be associated with MS 208A. Stream group B can include common bit rate (e.g., 128 kbps) EP 202B, 204B, and 206B, and may also be associated with MS 208B. According to embodiments, a translator can be positioned to enable communication between clients or endpoints from stream groups A and B.

In this particular example, because the characteristic that differs between stream groups A and B is bit rate (e.g., 320 kbps versus 128 kbps), a transrater function may be utilized here. XC/XR 210 can be inserted essentially between stream groups A and B to allow the appropriate conversions that may be needed for high quality video communication. Video streams from MS 208A of stream group A at a bit rate of 320 kbps can be converted in XR 212 to a bit rate of 128 kbps suitable for clients in stream group B (e.g., via MS 208B). However, video streams from MS 208B of stream group B at the 128 kbps bit rate may not require conversion to be suitable for clients in stream group A (e.g., via MS 208A). In this fashion, one transrater resource can be used for transrating functions between two separate stream groups.

A similar situation allowing for further translator resource savings may be for a codec difference of H.263 versus H.263+. Contrasted from the case where one codec format is H.263 and the other is H.264 (see, e.g., FIG. 1), a transcoder may be required for video streams going in each direction. However, clients using an H.263+ format may be able to handle streams in an H.263 codec format. Thus, no transcoding resource may be required for video streams originating in an H.263 codec format stream group and bound for an H.263+ codec format stream group.

Figure 3:
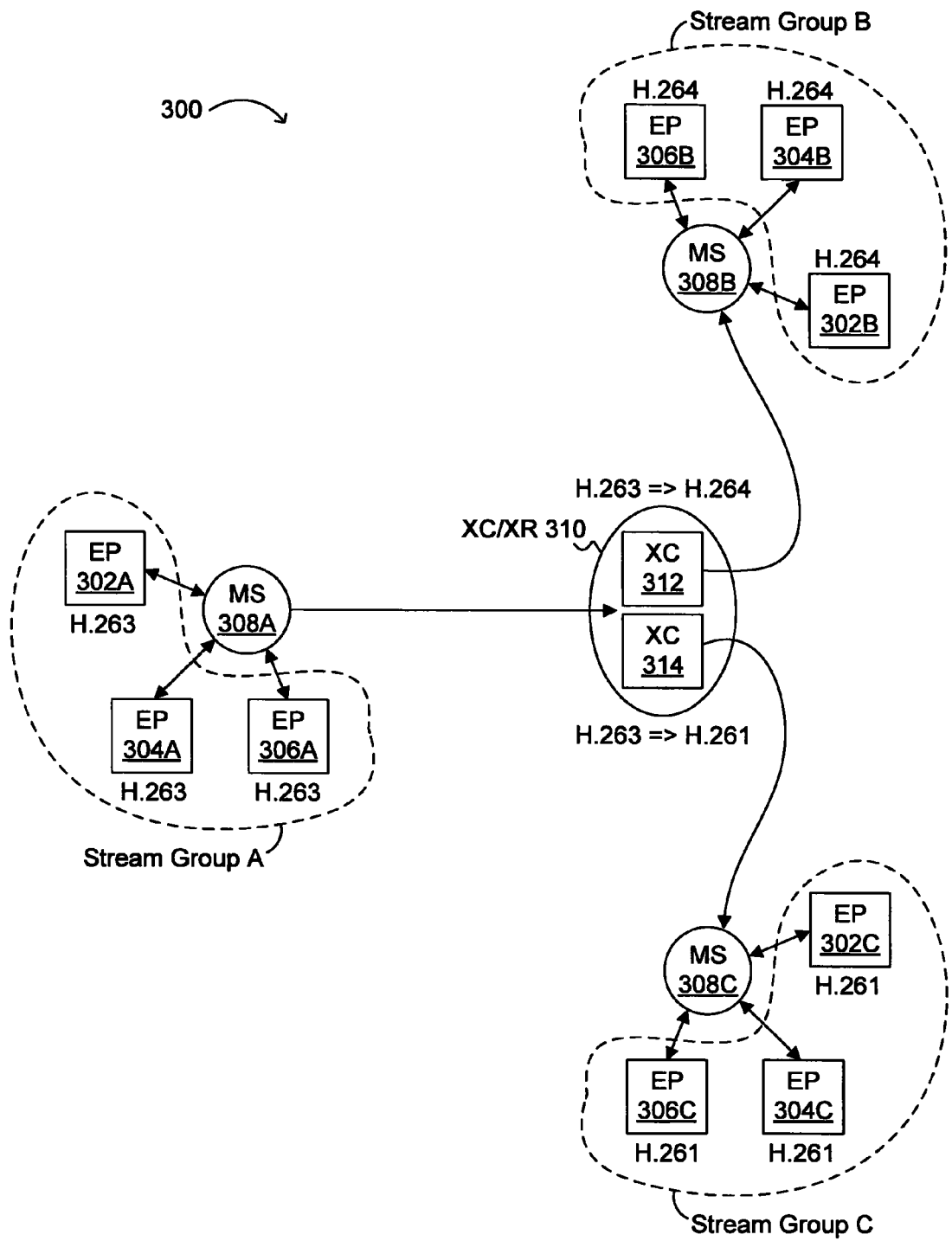
FIG. 3 is a block diagram illustrating an exemplary transcoder/transrater supporting multiple output streams in accordance with embodiments of the present invention.

Referring now to FIG. 3, a block diagram illustrating an exemplary translator supporting multiple output streams in accordance with embodiments of the present invention is indicated by the general reference character 300. Generally, for a system having N stream groups, N*(N−1)/2 pairs of transcoders/transraters may be needed. In one embodiment, a unidirectional translator having one input and multiple outputs for N stream groups may be employed as an alternative. Such an approach can allow for only N unidirectional translator devices and/or channels.

In the example of FIG. 3, stream group A can include client types having the common codec format of H.263 (e.g., EP 302A, 304A, and 306A, and stream group A can also be associated with MS 308A). Stream group B can include H.264 format codec EP 302B, 304B, and 306B, and stream group B can also be associated with MS 308B. Stream group C can include client types having the common codec format of H.261 (e.g., EP 302C, 304C, 306C, and stream group C can also be associated with MS 308C). Unidirectional XC/XR 310 can be positioned to allow for conversion in XC 312 of video streams from codec H.263 format stream group A into the H.264 codec format suitable for clients in stream group B (e.g., via MS 308B). Similarly, video streams from MS 308A of stream group A in the H.263 codec format can be converted in XC 314 to the H.261 codec format suitable for clients in stream group C (e.g., via MS 308C). In this fashion, one pair of unidirectional transcoder resources (e.g., two channels) can be shared for video stream paths from one stream group to two other stream groups.

In accordance with embodiments of the present invention, a translator or transcoder/transrater can be configured to accommodate a "smooth" switching from one video stream to another. In particular, a smooth switching between a current speaker stream and a last speaker stream can be accommodated. Further, configuration of a transcoder/transrater as a logical endpoint, as will be discussed in more detail below, can further facilitate such smooth switching in many applications. In addition, while FIGS. 4, 5, and 6, will be discussed with reference to particular "snapshots" or states of a switching process, a smooth switching function can be better appreciated by viewing these figures in conjunction and by considering a transition from the view in one of these figures to the view in another of these figures (as will also be discussed in detail below with reference to FIGS. 13, 14, 15, and 16).

Figure 4:
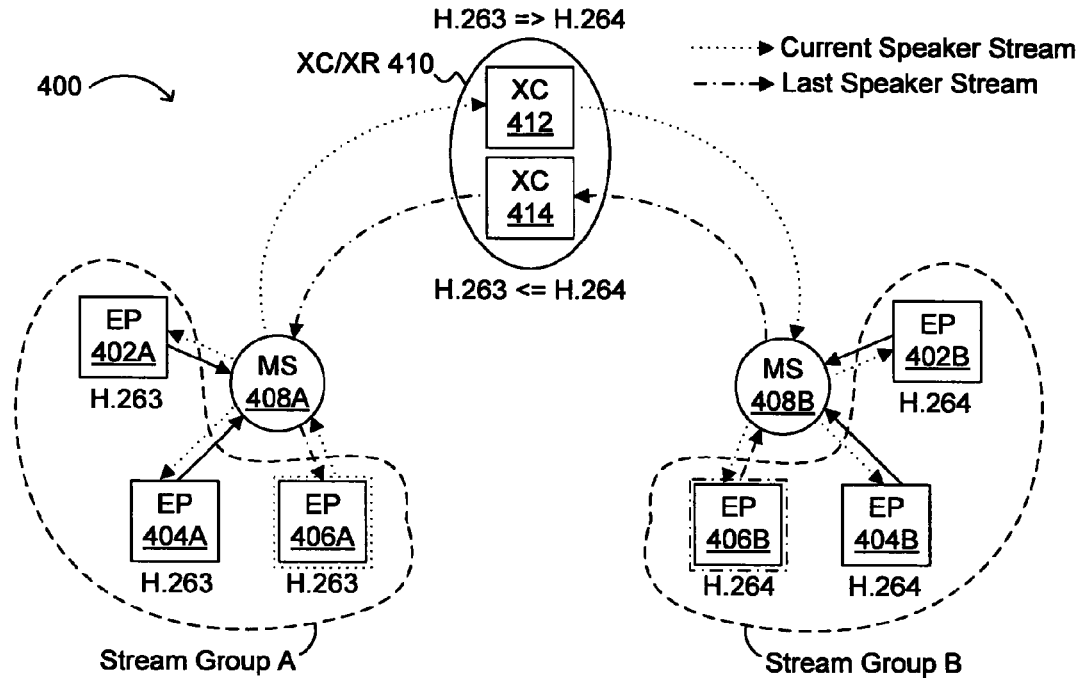
FIG. 4 is a block diagram illustrating a first exemplary video stream switching using a transcoder/transrater in accordance with embodiments of the present invention.

Referring now to FIG. 4, a block diagram illustrating a first exemplary video stream switching or "snapshot" of a smooth switching process using a translator in accordance with embodiments of the present invention is indicated by the general reference character 400. In this particular example, the current speaker can be EP 406A, included in stream group A with EP 402A and 404A, all using the H.263 codec format. MS 408A may also be associated with stream group A. The last speaker can be EP 406B, included in stream group B with EP 402B and 404B, all using the H.264 codec format. MS 408B may also be associated with stream group B. Of course, other codec formats, such as H.263+ and appropriate conversions from/to that format can also be used in accordance with embodiments.

The current speaker stream can thus flow from EP 406A to all other clients in the video conference. For the clients located within the same stream group (and, thus, having the same characteristics) as EP 406A, no conversion or use of XC/XR 410 may be required, and the video stream may simply pass via MS 408A. However, XC 412 can be used to convert current speaker streams from the H.263 format to the H.264 format to reach stream group B (e.g., EP 402B, 404B, and 406B via MS 408B). Further, because the last speaker stream may be provided to the current speaker, a unicast type of communication may be used to pass the last speaker stream from EP 406B via MS 408B, to conversion in XC 414 from codec H.264 format to codec H.263 format suitable for EP 406A (e.g., the current speaker) via MS 408A.

Figure 5:
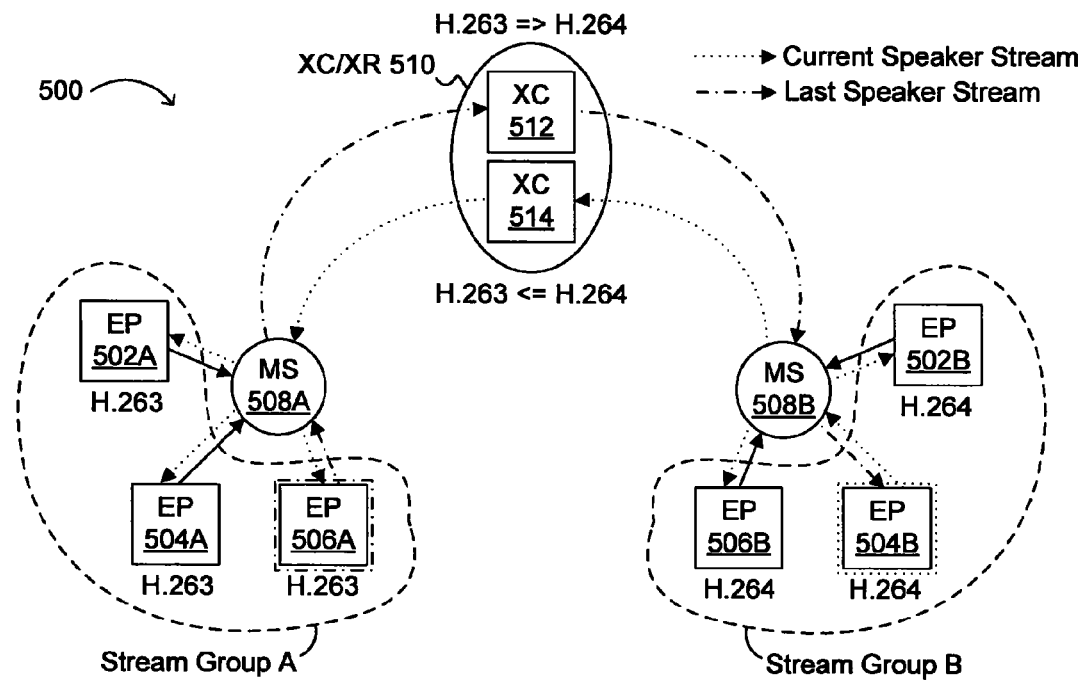
FIG. 5 is a block diagram illustrating a second exemplary video stream switching using a transcoder/transrater in accordance with embodiments of the present invention.

Referring now to FIG. 5, a block diagram illustrating a second exemplary video stream switching or "snapshot" of a smooth switching process using a translator in accordance with embodiments of the present invention is indicated by the general reference character 500. In this particular example, the current speaker can be EP 504B, included in stream group B with EP 502B, and 506B. Further, MS 508B can be associated with stream group B and the clients in stream group B may all use the H.264 codec format. The last speaker can be EP 506A, included in stream group A with EP 502A, and 504A. MS 508A can be associated with stream group A and the clients in stream group A can all use the H.263 codec format, for example.

The current speaker stream can thus flow from EP 504B to all other clients in the video conference. For the clients located in stream group B, no conversion or use of XC/XR 510 may be required, and the video stream may simply pass via MS 508B. However, XC 514 can be used to convert current speaker streams from the H.264 format to the H.263 format to reach stream group A (e.g., EP 502A, 504A, and 506A) via MS 508A. Further, the last speaker stream may pass from EP 506A via MS 508A, to conversion in XC 512 from codec H.263 format to codec H.264 format suitable for current speaker EP 504B via MS 508B.

Figure 6:
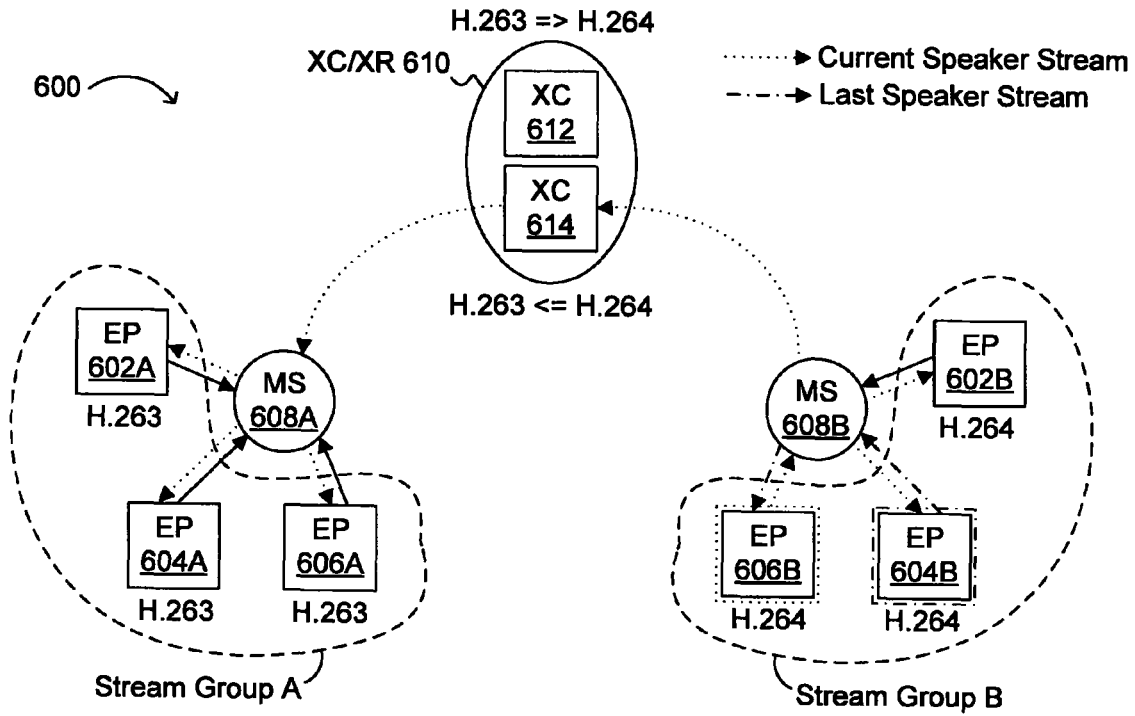
FIG. 6 is a block diagram illustrating a third exemplary video stream switching using a transcoder/transrater in accordance with embodiments of the present invention.

Referring now to FIG. 6, a block diagram illustrating a third exemplary video stream switching or "snapshot" of a smooth switching process using a translator in accordance with embodiments of the present invention is indicated by the general reference character 600. In this particular example, current and last speakers may be within the same stream group. Here, the current speaker can be EP 606B, while the last speaker can be EP 604B. Also included in stream group B using the H.264 codec format are EP 602B. Further, MS 608B may be associated with stream group B. The current speaker stream can thus flow from EP 606B to all other clients in the video conference. For the clients located in stream group B, no conversion or use of XC/XR 610 may be required, and the video streams may simply pass via MS 608B. However, XC 614 can be used (channel XC 612 may be unused in this example) to convert current speaker streams from the H.264 format to the H.263 format to reach stream group A (e.g., EP 602A, 604A, and 606A) via MS 608A. Further, the last speaker stream may pass to another endpoint within stream group B by going from EP 604B via associated MS 608B outside of stream group B to current speaker EP 606B.

Whenever a new active speaker is to be shown across the video conferencing session, a request can be sent to the new active speaker for an I-frame. This request can be sent by a controlling server (not shown) that may also set up the video conference session, including the assignment of endpoints and media switches to stream groups. Generally, an I-frame can represent a complete picture that may be "decoded" without a dependence on another picture. In addition to I-frames, P-frames, which may need a previous picture for decoding, may require less bandwidth, and can be sent periodically. For example, an I-frame may be sent once upon an active speaker change and then P-frames could be sent thereafter. More typically, however, I-frames can also be sent periodically (in addition to upon active speaker change), but at a slower rate than the P-frame updates. Further, in some applications, B-frames, which can interpolate between reference frames usually require even less bandwidth than P-frames and I-frames, can also be used.

According to embodiments of the present invention, a real time protocol (RTP) header extension bit can be used to make I-frame requests at the appropriate times to a translator. An I-frame request can be inserted in ingress streams to the translator by components, such as an associated media switch, coupled to the translator. In order to share the translator for a current and last speaker stream, this in-band I-frame request can be inserted when a video switch occurs between the different stream groups, for example. The translator can then generate an I-frame request as a response to the received I-frame request. In an egress stream from the translator, an RTP header extension with either a different or a same ID as the I-frame request can be used. This header extension may be used to distinguish a switch packet from the current (or last) speaker to the last (or current) speaker, for example. With this information, an associated media switch can determine the correct packet to stream to the last speaker if the translator is used for the last speaker stream or to all other participants if the translator is used for the current speaker stream.

Other approaches in accordance with embodiments of the present invention can include use of a time stamp by the translator. This time stamp may be the same time stamp as one that may be used in the ingress stream as in the egress stream. A media switch, for example, can simply compare the time stamp received from the translator with the time stamp the media switch has sent to the translator. In this fashion, the media switch can distinguish which packet is the switching packet and then stream the packets to the appropriate destination clients, for example.

Table 1 below shows an exemplary in-band I-frame request and marking structure.

TABLE 1

| V = 2 | p | X = 1 | cc | M | pt | seq |
|---|---|---|---|---|---|---|
| time stamp | | | | | | |
| synchronization source (SSRC) identifier | | | | | | |
| contributing source (CSRC) identifiers | | | | | | |
| ... | | | | | | |
| in-band I-frame request ID | | | | | | |

Figure 7:
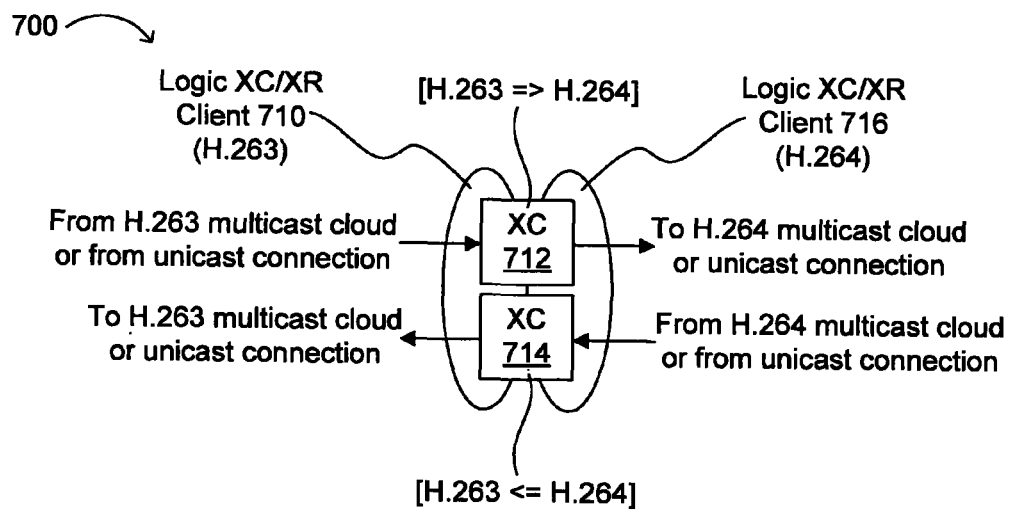
FIG. 7 is a block diagram illustrating a transcoder/transrater implementation suitable for use as a logical endpoint in accordance with embodiments of the present invention.

Referring now to FIG. 7, a block diagram illustrating a transcoder/transrater or translator implementation suitable for use as a logical endpoint in accordance with embodiments of the present invention is indicated by the general reference character 700. In this approach, the translator may be configured such that the device may be viewed by the rest of the system as a client or endpoint. Because the translator is intended to be connected from one stream group to another stream group, a pair of transcoders, for example, may be considered as two clients. Further, in this configuration, the translator may include: (i) a first interface having an input/output pair using the first format; and (ii) a second interface having another input/output pair using the second format. The two formats may differ in at least one characteristic.

In this particular example, the ingress H.263 channel (e.g., into XC 712) for H.263 to H.264 codec format conversion and the egress H.263 channel (e.g., from XC 714) for H.264 to H.263 codec format conversion may be "logically" considered as an H.263 codec format client (e.g., logic XC/XR client 710). Similarly, the ingress H.264 channel (e.g., into XC 714) for H.264 to H.263 codec format conversion and the egress H.264 channel (e.g., from XC 712) for H.263 to H.264 codec format conversion may be "logically" considered as an H.264 codec format client (e.g., logic XC/XR client 716).

Figure 8:
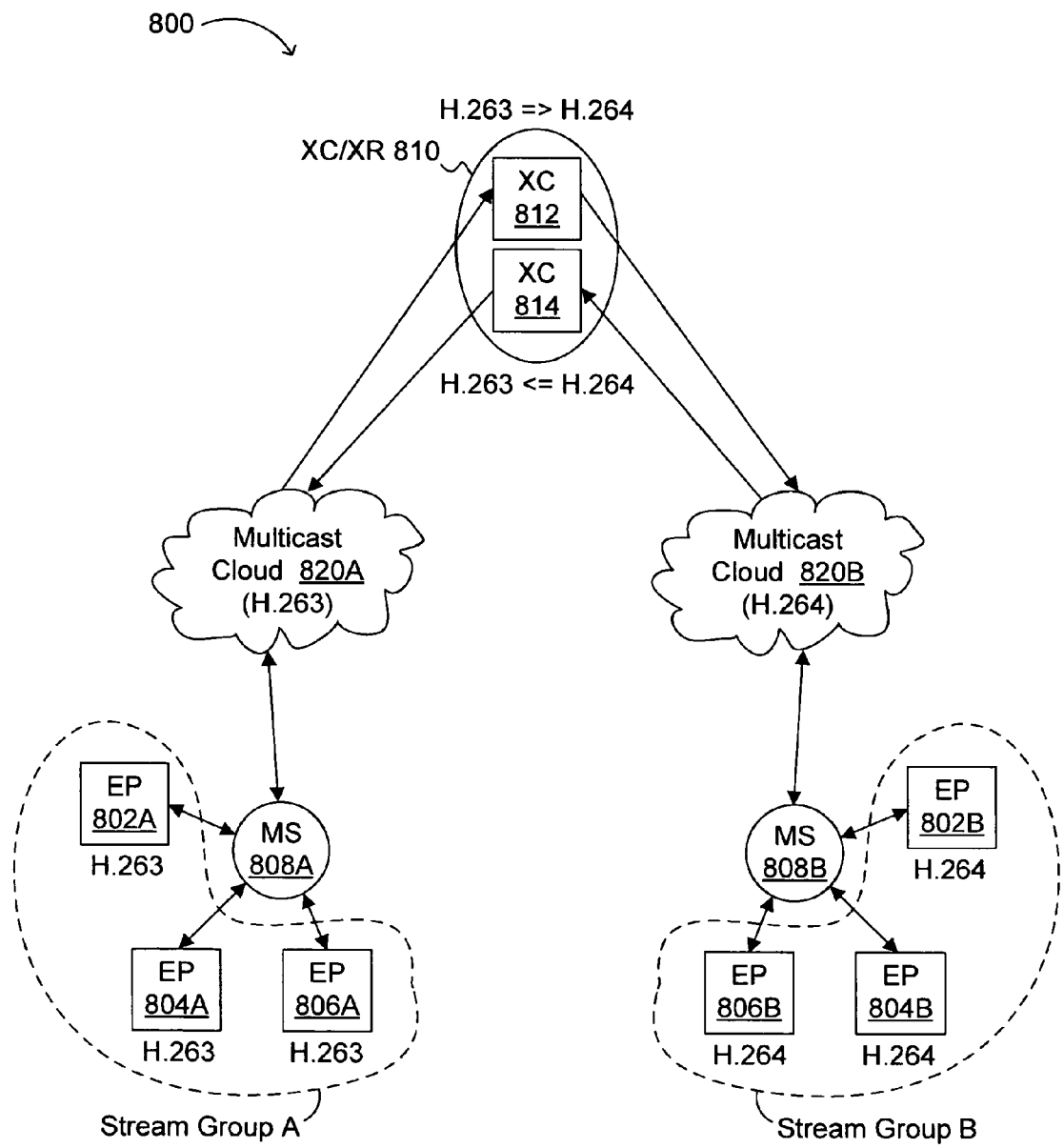
FIG. 8 is a block diagram illustrating a transcoder/transrater pair having multicast capability in accordance with embodiments of the present invention.

Referring now to FIG. 8, a block diagram illustrating a transcoder/transrater pair having multicast capability in accordance with embodiments of the present invention is indicated by the general reference character 800. In this particular configuration, the translator may be implemented as a core device having multicast capability for direct connection to multicast clouds (e.g., 820A and 820B). An alternative embodiment using the logical endpoint structure of FIG. 7 for a multicast network application will be discussed below with reference to FIG. 9. In FIG. 8, a complete translator entity is used in system operation, whereas a translator functions via a media switch in the configuration shown in FIG. 9, as will be discussed in more detail below.

In FIG. 8, stream group A can include client types having the common codec format of H.263 (e.g., EP 802A, 804A, 806A). Further, stream group A may have associated MS 808A). Stream group B can include H.264 codec format EP 802B, 804B, and 806B, and may have associated MS 808B. Stream group A can interface with multicast cloud 820A via MS 808A and stream group B can interface with multicast cloud 820B via MS 808B. XC/XR 810 can include XC 812 for conversion from codec format H.263 to H.264 for streams going from multicast cloud 820A to 820B. XC/XR 810 can also include XC 814 for conversion from codec format H.264 to H.263 for streams going from multicast cloud 820B to 820A. In this fashion, stream groups interfaced with multicast networks can be accommodated by one or more translator devices and/or channels, and a translator can be used for one or more media switches.

Figure 9:
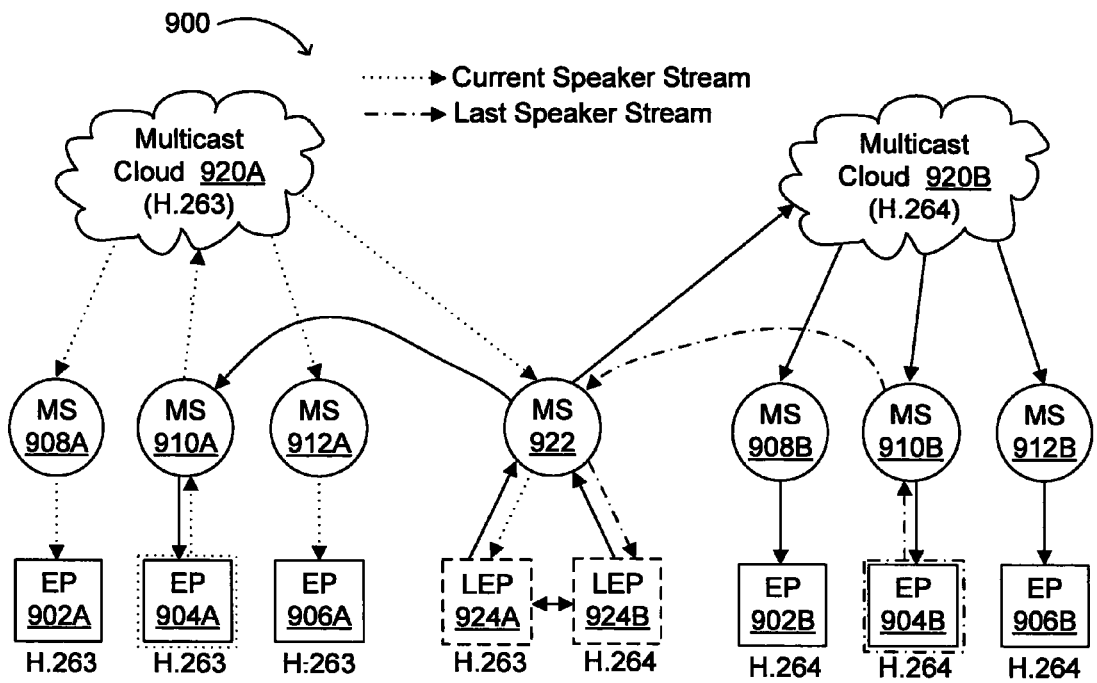
FIG. 9 is a block diagram illustrating a video stream switching using a transcoder/transrater as a logical endpoint in accordance with embodiments of the present invention.

Referring now to FIG. 9, a block diagram illustrating a video stream switching using a transcoder/transrater or translator as a logical endpoint in accordance with embodiments of the present invention is indicated by the general reference character 900. In this approach, the translator can be seen by the other system components as a regular client or endpoint. MS 922 can be associated with logical endpoints (LEP) 924A and 924B. Multicast cloud 920A can interface with MS 908A, 910A, and 912A, as well as MS 922. Similarly, multicast cloud 920B can interface with MS 908B, 910B, and 912B, as well as MS 922. In this particular example, single endpoints can be associated with each media switch, but, as discussed with reference to several examples above, multiple endpoints may form a stream group and be associated with a media switch.

EP 904A can be the current speaker and EP 904B can be the last speaker. Accordingly, the current speaker stream can originate in EP 904A and pass via MS 910A to multicast cloud 920A. The current speaker stream can be disseminated without conversion from multicast cloud 920A to EP 902A via MS 908A and to EP 906A via MS 912A. Of course, no conversion may be required here because EP 902A, 904A, and 906A are all in the H.263 codec format. In order to reach the other clients or endpoints (e.g., EP 902B, 904B, and 906B, all in H.264 format) in the video conference, a conversion from H.263 to H.264 codec format may occur using a translator device.

In this particular example, because the translator may be a logical endpoint, the stream must first pass through an assigned media switch (e.g., MS 922). The current speaker stream can pass from multicast cloud 920A to MS 922, and then to LEP 924A/924B for conversion. The converted stream can pass from MS 922 to multicast cloud 920B and then to MS 908B (for EP 902B), MS 910B (for EP 904B), and MS 912B (for EP 906B). The last speaker stream can pass from EP 904B via 910B to MS 922 to LEP 924A/924B for conversion into H.263 codec format, and then to current speaker EP 904A via MS 910A. In this fashion, a logical endpoint translator can be employed in a video conferencing system having multiple codec formats. Further, according to embodiments, LEP 924A/924B may be substantially transparent to MS 922 (e.g., as to whether there is a transcoder or a more standard type of endpoint on the network), except for an in-band I-frame request sent to the translator, as discussed above.

Figure 10:
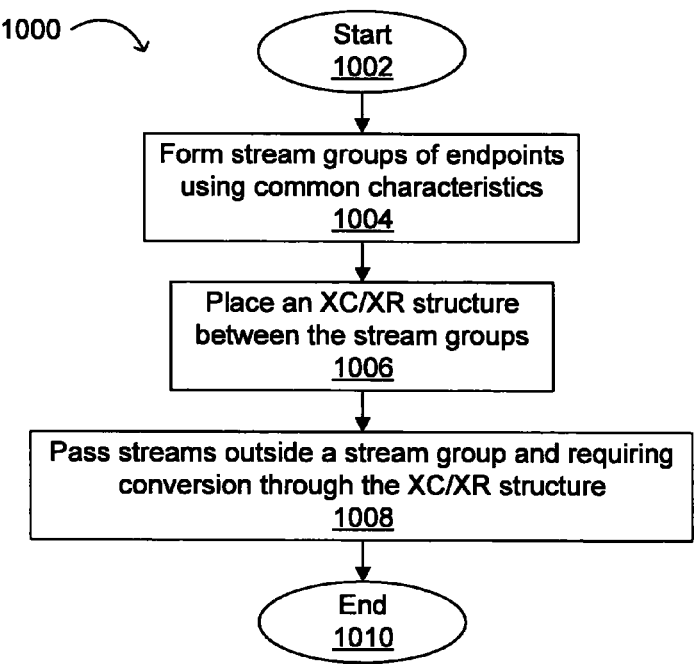
FIG. 10 is a flow diagram illustrating an exemplary method of converting streams in a distributed video conference in accordance with an embodiment of the present invention.

Referring now to FIG. 10, a flow diagram illustrating an exemplary method of converting streams in a distributed video conference in accordance with an embodiment of the present invention is indicated by the general reference character 1000. The flow can begin (1002) and stream groups of endpoints using common characteristics can be formed (1004). As discussed above, a media switch can be associated with, but not formed within, the same stream group. This grouping may be performed by a controlling server, or the like. Among the characteristics considered for grouping are the codec format, the bit rate, the frame rate, picture resolution, and transportation carrying protocol, for example. A transcoder/transrater or translator structure can be placed or arranged in the video stream flow between the stream groups (1006), as discussed above. Streams passed outside a stream group (thus requiring conversion) can be converted in the translator structure (1008) and the flow can complete (1010).

Figure 11:
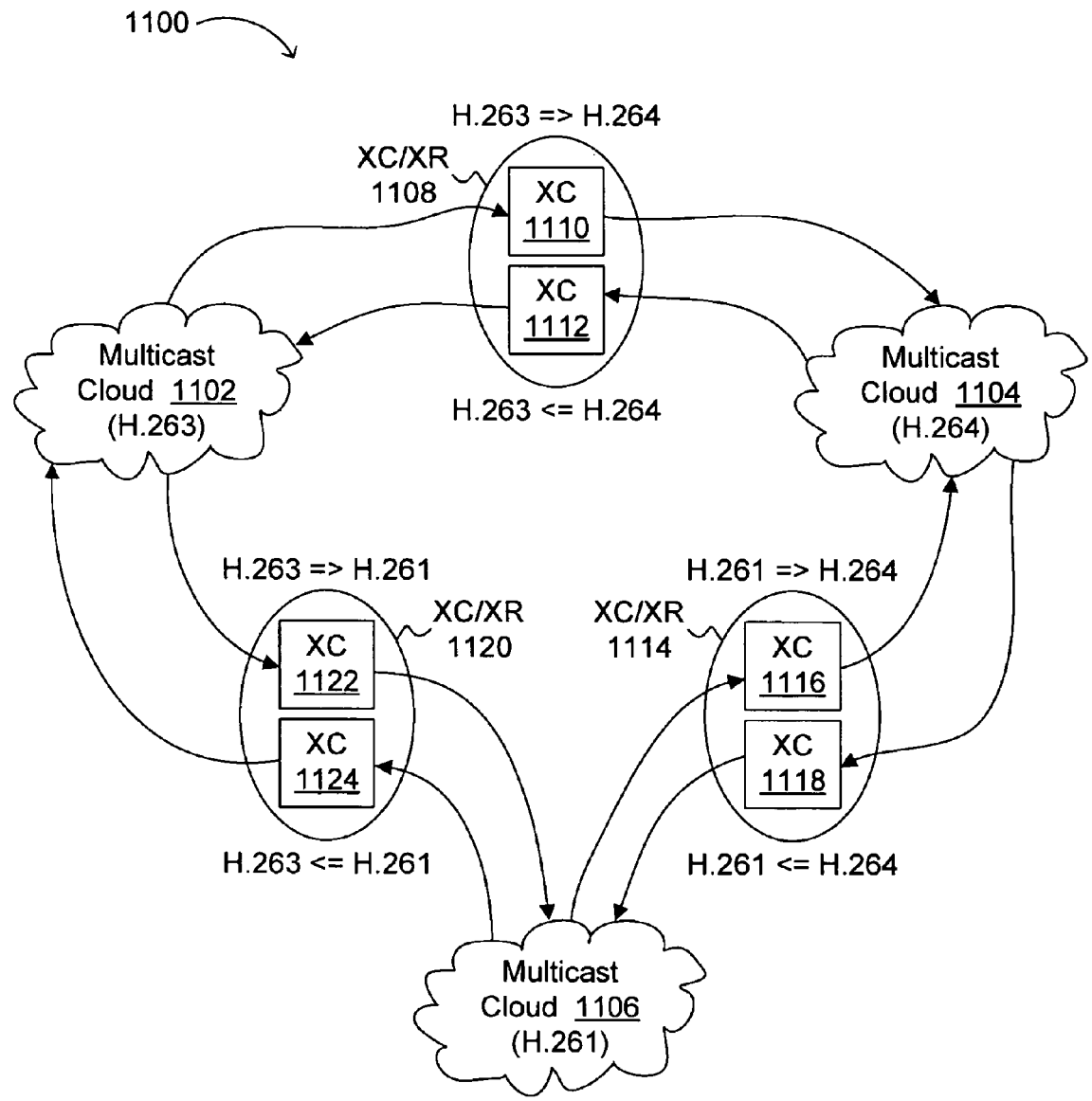
FIG. 11 is a block diagram illustrating an exemplary transcoder/transrater operation for three stream groups in accordance with embodiments of the present invention.

Referring now to FIG. 11, a block diagram illustrating an exemplary transcoder/transrater operation for three stream groups in accordance with embodiments of the present invention is indicated by the general reference character 1100. Multicast cloud 1102 can include streams using the H.263 codec format and may interface with translator 1108 (e.g., including channels XC 1110 and 1112) and translator 1120 (e.g., including channels XC 1122 and 1124). Multicast cloud 1104 can include streams using the H.264 codec format and may interface with translator 1108 and translator 1114 (e.g., including channels XC 1116 and 1118). Similarly, multicast cloud 1106 can include streams using the H.261 codec format and may interface with translators 1114 and 1120.

Figure 12:
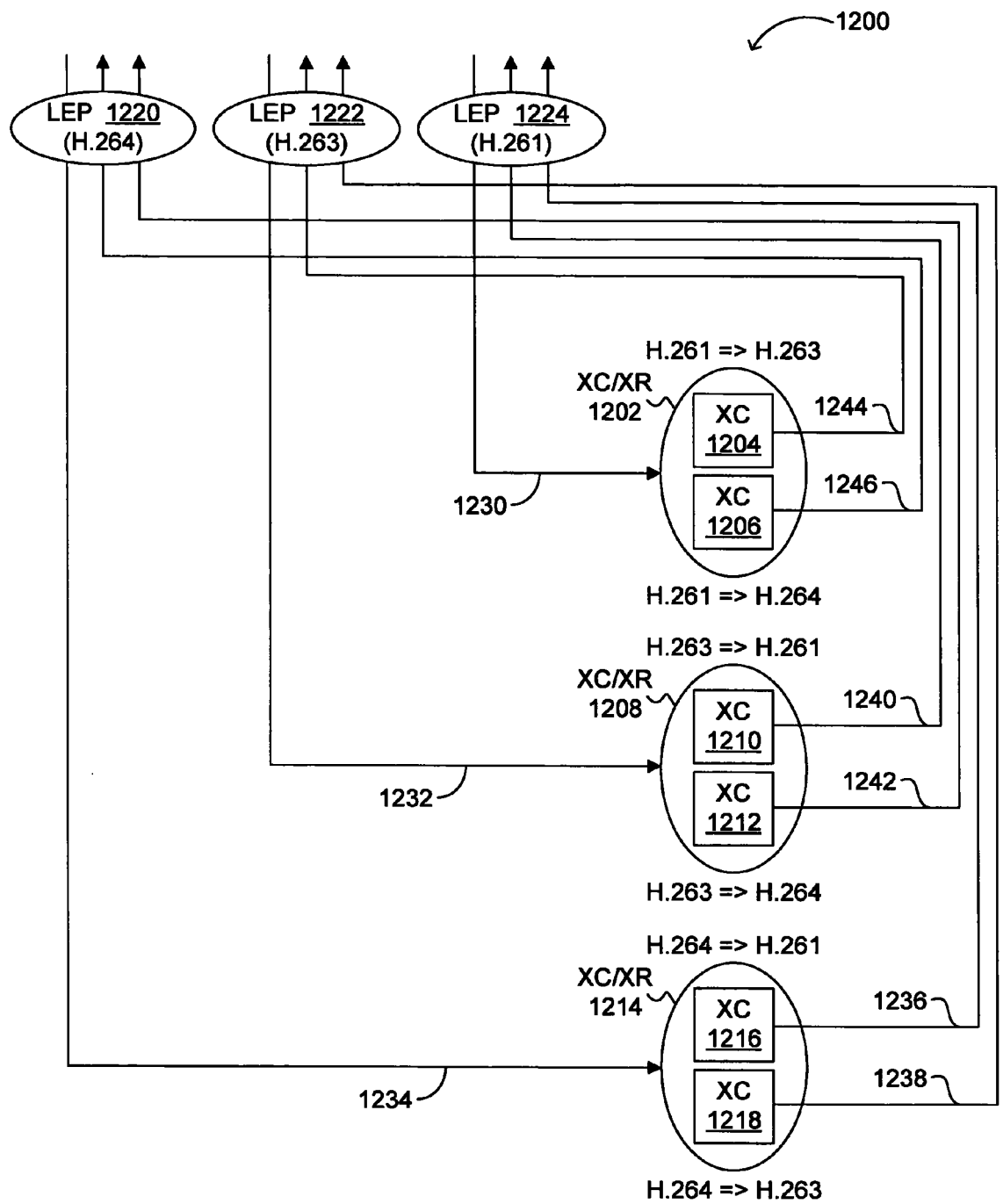
FIG. 12 is a block diagram illustrating an exemplary transcoder/transrater arrangement suitable for use with three stream groups in accordance with embodiments of the present invention.

Referring now to FIG. 12, a block diagram illustrating an exemplary transcoder/transrater arrangement suitable for use with three stream groups in accordance with embodiments of the present invention is indicated by the general reference character 1200. LEP 1220 can provide stream 1234 to translator 1214 (e.g., including XC 1216 and XC 1218) for translation from the H.264 codec format to the H.261 codec format (e.g., stream 1236) and the H.263 codec format (e.g., stream 1238). Stream 1236 can pass to LEP 1224 and stream 1238 can pass to LEP 1222. LEP 1222 can provide stream 1232 to translator 1208 (e.g., including XC 1210 and XC 1212) for translation from the H.263 codec format to the H.261 codec format (e.g., stream 1240) and the H.264 codec format (e.g., stream 1242). Stream 1240 can pass to LEP 1224 and stream 1242 can pass to LEP 1220. LEP 1224 can provide stream 1230 to translator 1202 (e.g., including XC 1204 and XC 1206) for translation from the H.261 codec format to the H.263 codec format (e.g., stream 1244) and the H.264 codec format (e.g., stream 1246). Stream 1244 can pass to LEP 1222 and stream 1246 can pass to LEP 1220.

Figure 13:
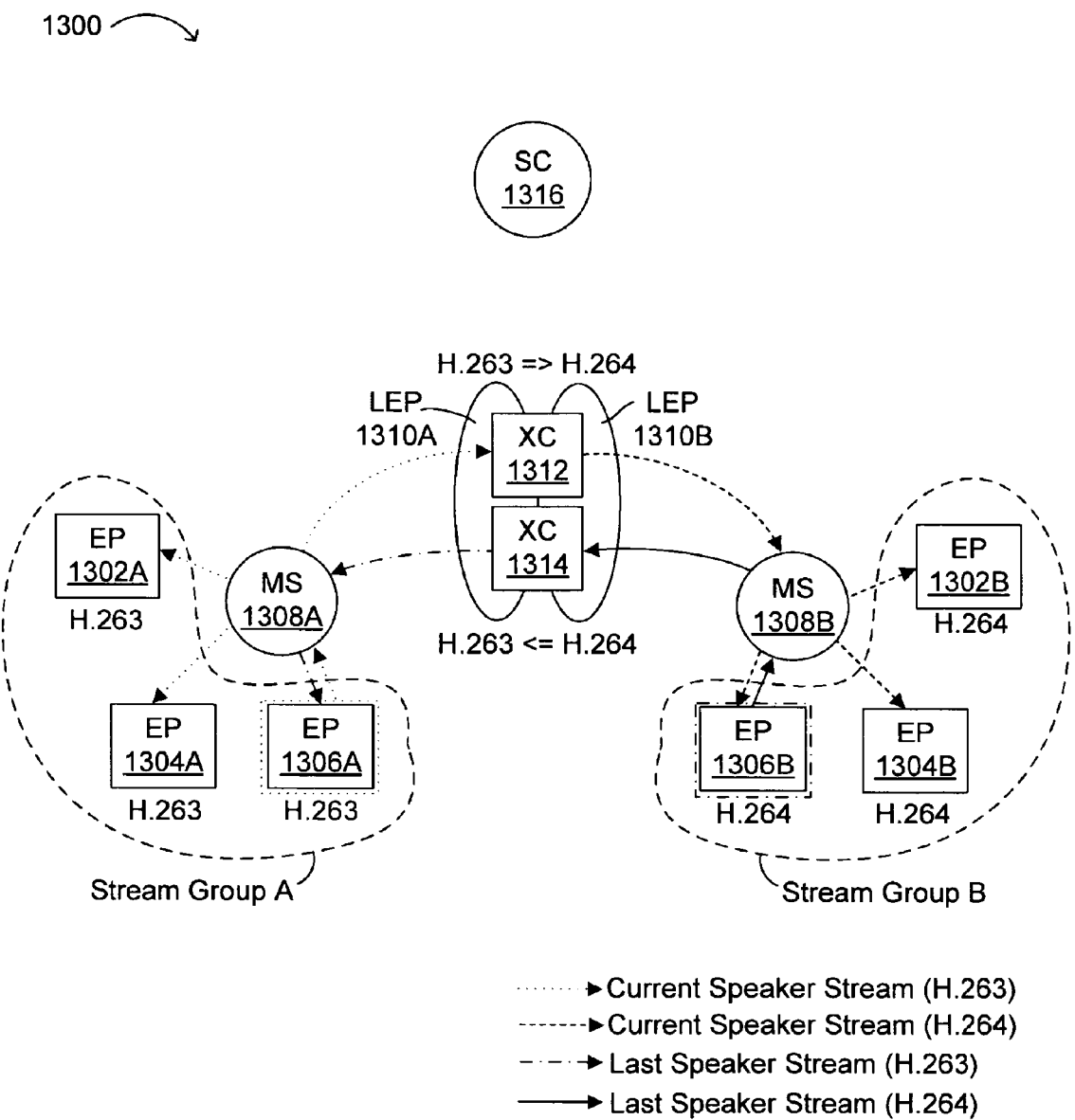
FIG. 13 is a block diagram illustrating a first smooth switching example stage using a transcoder/transrater configured as a logical endpoint in accordance with embodiments of the present invention.

Referring now to FIG. 13, a block diagram illustrating the first of a series of smooth switching example stages using a transcoder/transrater configured as a logical endpoint in accordance with embodiments of the present invention is indicated by the general reference characters 1300. In this particular example, the current speaker can be EP 1306A, included in stream group A with EP 1302A and 1304A, all using the H.263 codec format. Stream group A may also have an associated media switch, MS 1308A. The last speaker can be EP 1306B, included in stream group B with EP 1302B and 1304B, all using the H.264 codec format. Stream group B may also have an associated media switch, MS 1308B. Of course, other codec formats, such as H.263+ and appropriate conversions from/to that format can also be used in accordance with embodiments.

Further, XC 1312 and XC 1314 may be configured as a logical endpoint pair (e.g., LEP 1310A and 1310B). An H.263 input stream of XC 1312 and an H.263 output stream of XC 1314 can form H.263 logical endpoint LEP 1310A. Similarly, an H.264 input stream of XC 1314 and an H.264 output stream of XC 1312 can form H.264 logical endpoint LEP 1310B. For stream group A, the active speaker can be EP 1306A and the previous speaker can be LEP 1310A, since XC 1314 may carry the previous speaker stream from EP 1306B, for example. For stream group B, the active speaker can be LEP 1310B, since XC 1312 may carry the active speaker stream from EP 1306A, for example. The previous speaker for stream group B may be EP 1306B.

Also included in FIG. 13 is stream controller (SC) 1316, which can also be associated with an audio mixer (not shown) and which may provide notifications to media switches of any change in the active speaker. All such switching may be handled by media switches MS 1308A and MS 1308B, for example. In this particular example, all of the endpoints associated with MS 1308A may be in stream group A and all of the endpoints associated with MS 1308B may be in stream group B. However, a media switch may have endpoints from different stream groups associated therewith in accordance with embodiments of the present invention.

The current speaker stream can flow from EP 1306A to all other clients in the video conference. For clients located within the same stream group (and, thus, having the same characteristics) as EP 1306A, no conversion or use of XC 1312 and/or XC 1314 may be required, and the video stream may simply pass via MS 1308A. However, XC 1312 can be used to convert current speaker streams from the H.263 format to the H.264 format to reach stream group B (e.g., EP 1302B, 1304B, and 1306B) via MS 1308B, for example. Further, because the last speaker stream may be provided to the current speaker, a unicast type of communication may be used to pass the last speaker stream from EP 1306B via MS 1308B, to conversion in XC 1314 from codec H.264 format to codec H.263 format suitable for EP 1306A (e.g., the current speaker) via MS 1308A. The new current speaker EP 1306A may see an uninterrupted video stream from EP 1306B throughout the switch (i.e., a "smooth switching").

Figure 14:
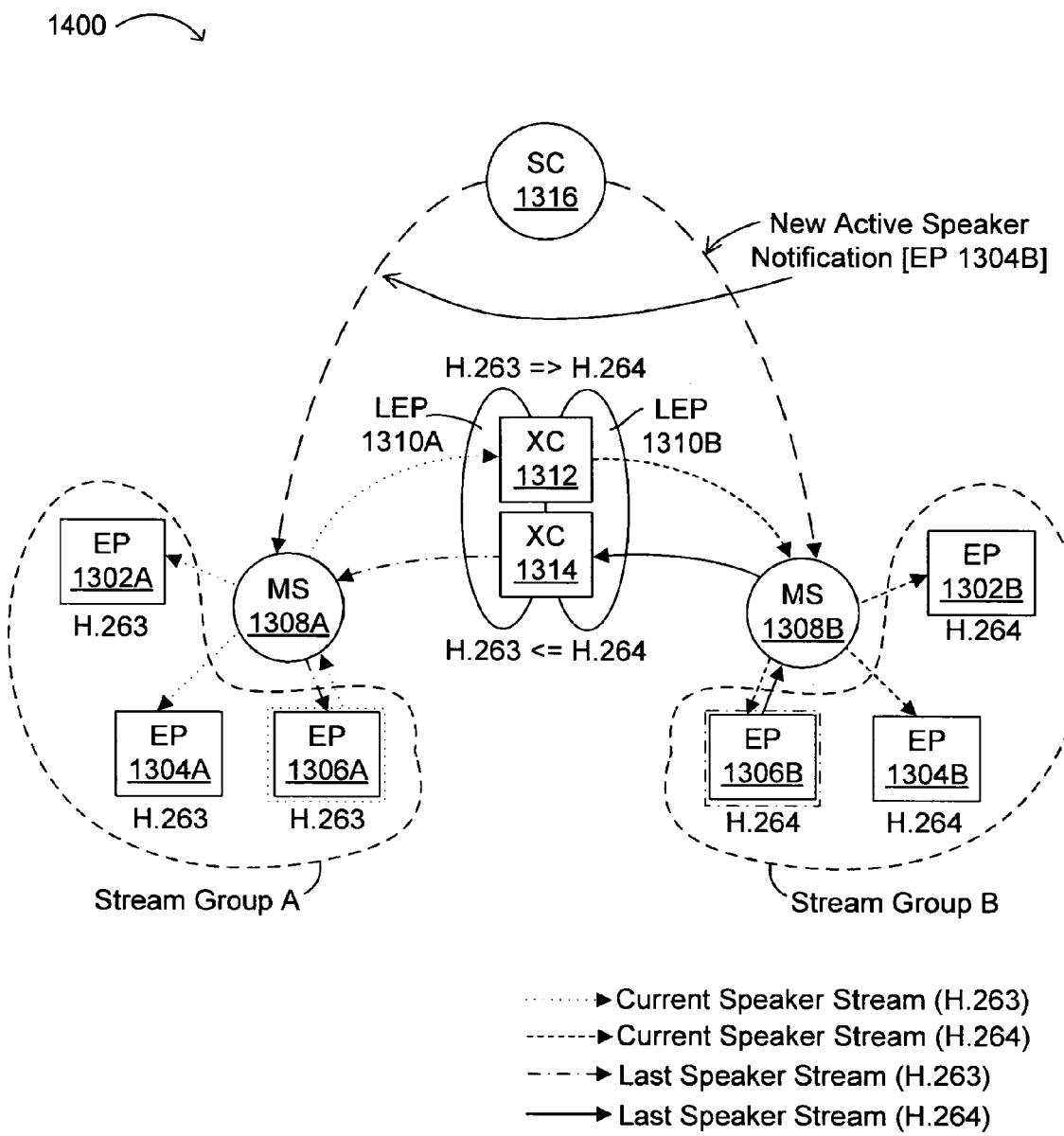
FIG. 14 is a block diagram illustrating a second smooth switching example stage using a transcoder/transrater configured as a logical endpoint in accordance with embodiments of the present invention.
Figure 15:
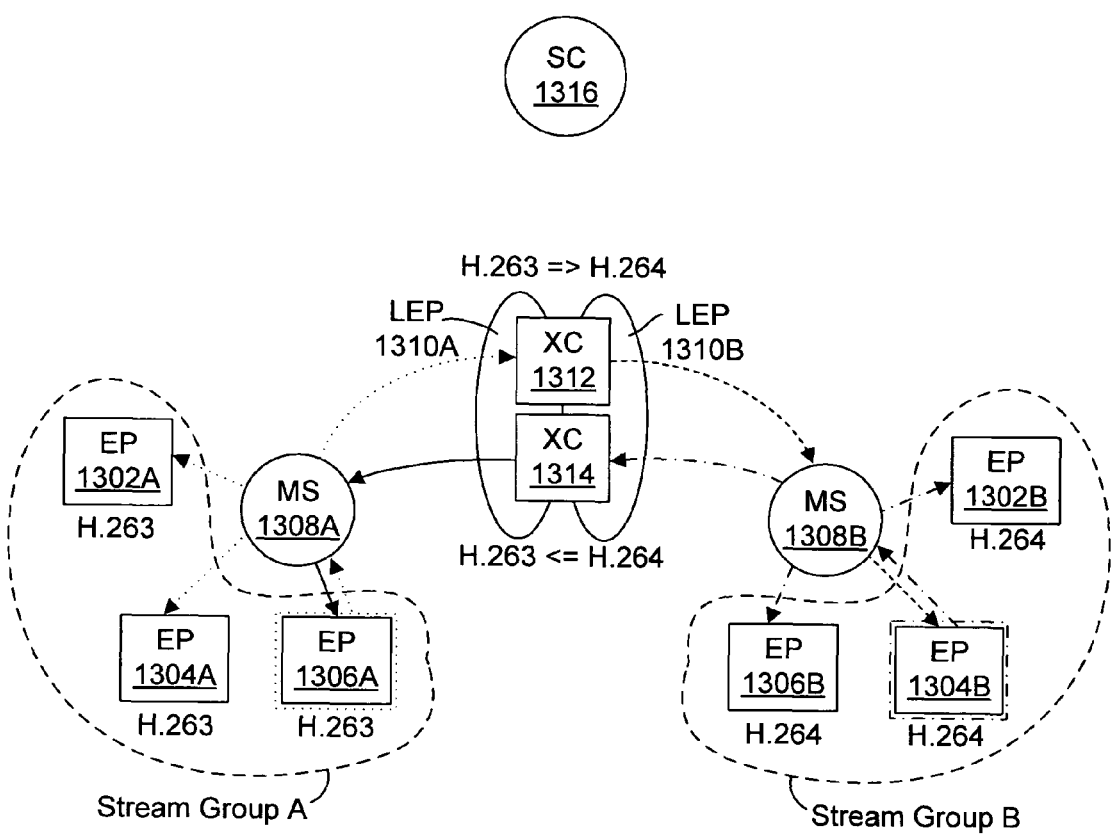
FIG. 15 is a block diagram illustrating a third smooth switching example stage using a transcoder/transrater configured as a logical endpoint in accordance with embodiments of the present invention.
Figure 16:
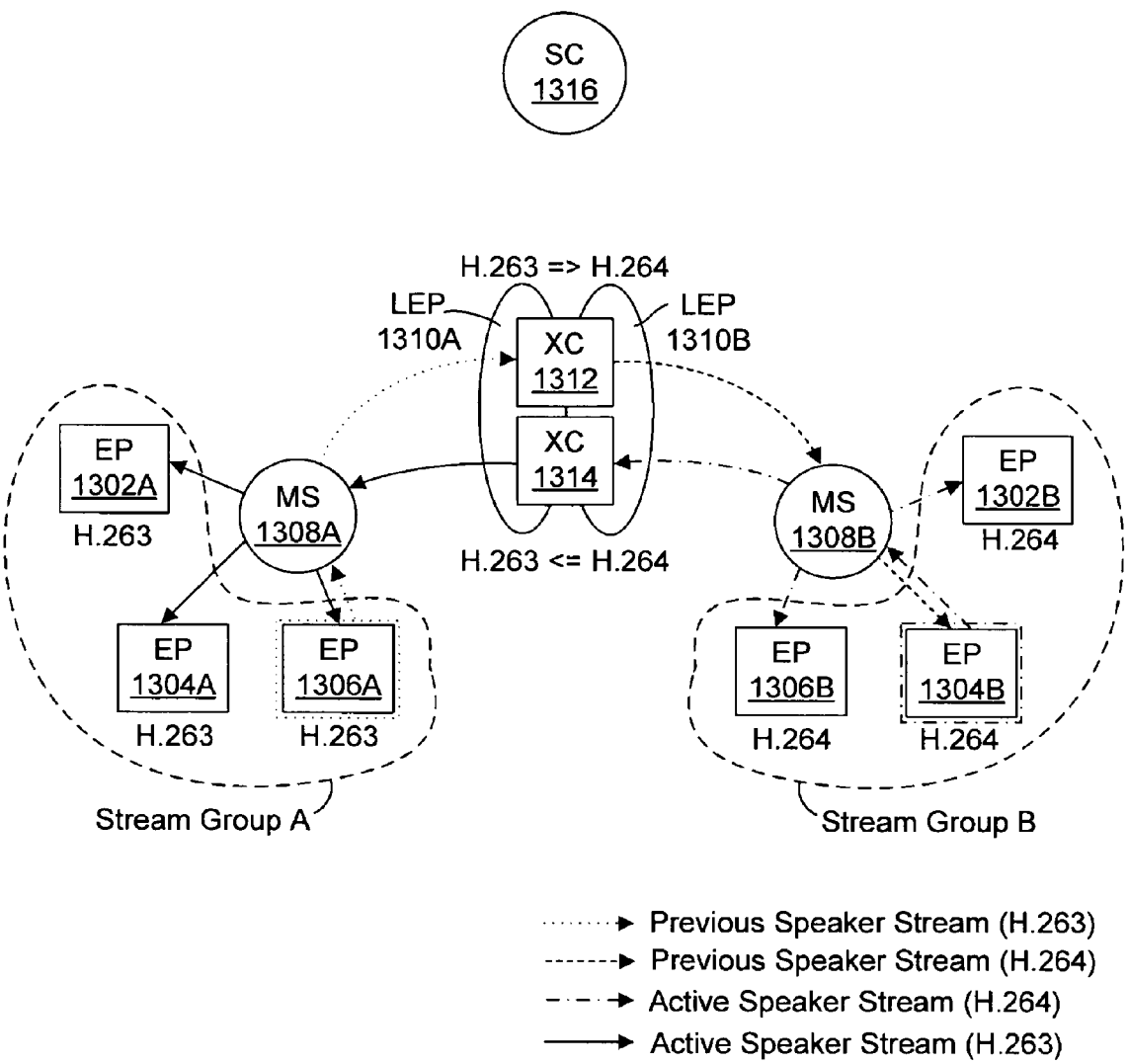
FIG. 16 is a block diagram illustrating a fourth smooth switching example stage using a transcoder/transrater configured as a logical endpoint in accordance with embodiments of the present invention.

FIGS. 14-16 will depict the next smooth switch as the EP 1304B becomes the active speaker, for example. Referring now to FIG. 14, a block diagram illustrating a first smooth switching example stages using a transcoder/transrater configured as a logical endpoint in accordance with embodiments of the present invention is indicated by the general reference characters 1400. In the example of FIG. 14, the start of a change in active speaker from EP 1306A to EP 1304B is shown. To facilitate this change, SC 1316 may notify both MS 1308A and MS 1308B of the new active speaker. Each media switch can now process this notification from SC 1316.

Referring now to FIG. 15, a block diagram illustrating a first smooth switching example stages using a transcoder/transrater configured as a logical endpoint in accordance with embodiments of the present invention is indicated by the general reference characters 1500. In the example of FIG. 15, the interim processing of the speaker change from EP 1306A to EP 1304B is shown. The initial processing by each media switch of the speaker change notification of EP 1304B as new speaker can take place. MS 1308B can see that EP 1304B is an endpoint with which it is associated, so MS 1308B can immediately process the notification (e.g., received from SC 1316). MS 1308B can immediately stop transmitting the old previous speaker stream from EP 1306B. MS 1308B can begin transmitting the stream from EP 1304B (the new speaker) to all other endpoints in the group, including LEP 1310B. Further, since the previous active speaker for this stream group was LEP 1310B, MS 1308B can continue to pass the video stream from XC 1312 to the new active speaker, EP 1304B.

Since the new active speaker endpoint is not associated with MS 1308A, it may do nothing until MS 1308A actually sees the new active speaker stream packets (e.g., via identification by header extension bits). Accordingly, the stream from EP 1306B (the old active speaker) can continue to flow to XC 1312 and on to the new active speaker, EP 1304B. In this fashion, a smooth switch for the previous speaker stream can be implemented in accordance with embodiments of the present invention.

Referring now to FIG. 16, a block diagram illustrating a first smooth switching example stages using a transcoder/transrater configured as a logical endpoint in accordance with embodiments of the present invention is indicated by the general reference characters 1600. In the example of FIG. 16, a final processing of the speaker switch can include the new stream from EP 1304B being propagated across XC 1314 and may be detected by MS 1308A. MS 1308A may have identified this stream as the new active speaker stream for stream group A, and thus may transmit this stream to all endpoints in stream group A. Since MS 1308A knows that EP 1306A was the previous active speaker, MS 1308A may continue to transmit that stream to the new active speaker, which may be viewed as LEP 1310A, for example, to complete the speaker switch.

In this fashion, a translator can be used to facilitate video streaming in a distributed arrangement. Such an approach in accordance with embodiments of the present invention can allow for video streams to be converted from one characteristic of one stream group to another characteristic to match that of the other stream group. Algorithms and/or methods in accordance with embodiments may also be used to set up stream groups according to such characteristics and to facilitate video streaming from one stream group to another.

Accordingly, embodiments of the present invention pertain to the use of translator structures to facilitate video streaming in a distributed arrangement and include advantages of: (i) sharing translator resources for the current speaker stream and the last speaker stream with relatively smooth switching; and (ii) reducing system costs due to lower overall DSP resource requirements. Further, transcoders/transraters in accordance with embodiments can be configured as a core device or as a logical endpoint associated with or attached to a media switch for enhanced system applications.

Embodiments of the present invention can be used for any application that involves distributed media interchange, distribution, or conferencing, such as video conferencing, where media (e.g., video) streams may be converted and/or forwarded and receivers may need to gain awareness of transitions to new speakers.

While embodiments herein have been discussed with reference to video conferencing, embodiments of the present invention are not limited thereto. For example, many other types of media and associated interchange or communication may be used in accordance with embodiments of the present invention. Further, specific network arrangements and configurations shown herein are merely exemplary and one skilled in the art will recognize that other variations may be used in accordance with embodiments. Accordingly, variations and embodiments other than those discussed herein are possible.

Although embodiments of the invention are discussed primarily with reference to specific examples, any acceptable architecture, topology, protocols, network arrangement, forms of media, distribution arrangements, or other network and/or digital processing features can be employed. In general, network controllers, managers, access points, clients, and so on, can be implemented via any device with processing ability or other requisite functionality. It is also possible that functionality relevant to embodiments of the present invention can be included in a router, switch and/or other integrated device.

Although processes of the present invention, and the hardware executing the processes, may be characterized by language common to a discussion of the Internet (e.g., "client," "server," "peer") it should be apparent that operations of the present invention can execute on any type of suitable hardware in any communication relationship to another device on any type of link or network.

Although a process of the present invention may be presented as a single entity, such as software executing on a single machine, such software can readily be executed on multiple machines. That is, there may be multiple instances of a given software program, a single program may be executing on two or more processors in a distributed processing environment, parts of a single program may be executing on different physical machines, etc. Furthermore, two different programs, such as a client and server program, can be executing in a single machine, or in different machines. A single program can be operating as a client for one information transaction and as a server for a different information transaction.

Any type of processing or media presentation device can be used as a device suitable for a network connection as an endpoint. For example, portable computing devices such as a personal digital assistant (PDA), cell phone, laptop computer, or other devices can be employed. In general, the devices and manner of specific processing (including location and timing) are not critical to practicing important features of embodiments of the present invention.

Although embodiments of the present invention have been discussed primarily with respect to video conferencing associated with a network, such as the Internet, any suitable network, network topology, transmission protocols, sender-receiver devices and relationships, and other characteristics or properties of electronic devices, processes and transmission methods can be used. For example, features of the invention can be employed on various scales and in various applications, including local area networks (LANs), campus or corporate networks, home networks, etc.

Although the invention has been discussed with respect to specific embodiments thereof, these embodiments are merely illustrative, and not restrictive, of the invention. Embodiments of the present invention can operate between any two processes or entities including users, devices, functional systems or combinations of hardware and software. Peer-to-peer networks and any other networks or systems where the roles of client and server are switched, change dynamically, or are not even present are within the scope of the invention.

Any suitable programming language can be used to implement the routines or other instructions employed by various network entities. Exemplary programming languages include C, C++, Java, assembly language, etc. Different programming techniques can be employed such as procedural or object oriented. The routines can execute on a single processing device or multiple processors. Although the steps, operations or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "machine-readable medium" or "computer-readable medium" for purposes of embodiments of the present invention may be any medium that can contain and store the program for use by or in connection with the instruction execution system, apparatus, system or device. The computer readable medium can be, by way of example only but not by limitation a semiconductor system, apparatus, system, device, or computer memory.

A "processor" or "process" includes any hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented in whole or in part by using a programmed general purpose digital computer; by using application specific integrated circuits, programmable logic devices, field programmable gate arrays, optical, chemical, biological, quantum or nanoengineered systems or mechanisms; and so on. In general, the functions of the present invention can be achieved by any means as is known in the art. Distributed or networked systems, components, and/or circuits can be used. Communication, or transfer of data, may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow "a", "an", and "the" include plural references unless the context clearly dictates otherwise. Furthermore, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A translator comprising:
   a first transcoder; and
   a second transcoder, wherein the first and second transcoders are configured to function as a first logical endpoint having a first input-output pair in communication with a first media switch, wherein the first transcoder functions as an input of the first input-output pair, wherein the second transcoder functions as an output of the first input-output pair, wherein the first and second transcoders are also configured to function as a second logical endpoint having a second input-output pair in communication with a second media switch, wherein the first transcoder functions as an output of the second input-output pair, and wherein the second transcoder functions as an input of the second input-output pair, wherein the first transcoder of the first input-output pair is configured to receive a first video stream in a first format, wherein the second transcoder of the first input-output pair is configured to provide a second video stream converted from a second format to the first format, the second video stream being a previous speaker stream, wherein the translator is shared between the previous speaker stream and a current speaker stream by a component associated with the previous speaker stream inserting a first I-frame request in an ingress stream to the translator when a video switch occurs from the previous speaker stream to the current speaker stream, and wherein the translator generates a second I-frame request as a response to the first I-frame request, and wherein the previous speaker stream is associated with an H.263 protocol and the current speaker stream is associated with an H.264 protocol, and wherein a unicast protocol is used to communicate the previous speaker stream, which undergoes a conversion between a codec H.264 format and a codec H.263 format, to an endpoint associated with a current speaker of a video conference, wherein, when more than two participants are participating in a video conference, the previous speaker stream is to be displayed to a participant in the video conference while the participant is the current speaker and the current speaker stream is displayed to all other participants in the video conference when not the current speaker.

2. The translator of claim 1, wherein the first media switch is associated with a first stream group and the second media switch is associated with a second stream group, and wherein the first and second stream groups have a different encoder/decoder (codex) format characteristic.

3. The translator of claim 1, wherein the first media switch is associated with a first stream group and the second media switch is associated with a second stream group, and wherein the first and second stream groups have a different bit rate characteristic.

4. The translator of claim 1, wherein the first media switch is associated with a first stream group and the second media switch is associated with a second stream group, and wherein the first and second stream groups have a different picture resolution characteristic.

5. The translator of claim 1, wherein the first media switch is associated with a first stream group and the second media switch is associated with a second stream group, and wherein the first and second stream groups have a different transportation carrying protocol characteristic.

6. The translator of claim 1, wherein the first media switch is associated with a first stream group and the second media switch is associated with a second stream group, and wherein the first and second stream groups have a different frame rate characteristic.

7. The translator of claim 1, wherein the translator is configured as a logical endpoint.

8. The translator of claim 1, wherein the translator is configured in the router.

9. The translator of claim 1, wherein the translator is configured as unidirectional.

10. A method comprising: grouping one or more end points into first and second stream groups, wherein the grouping is based on like characteristics, the one or more endpoints being associated with respective first and second media switches configuring a translator structure to convert from a first format to a second format, wherein the translator structure is associated with a video stream path between the first and second stream groups, wherein the translator structure comprises first and second transcoders that are configured to function as a first logical endpoint having a first input-output pair in communication with the first media switch, wherein the first transcoder functions as an input of the first input-output pair, wherein the second transcoder functions as an output of the first input-output pair, wherein the first and second transcoders are also-configured to function as a second logical endpoint having a second input-output pair in communication with the second media switch, wherein the first transcoder functions as an output of the second input-output pair, wherein the second transcoder functions as an input of the second input-output pair, wherein the first transcoder of the first input-output pair is configured to receive a first video stream in a first format, the first video stream being a current speaker stream, wherein the second transcoder of the first input-output pair is configured to provide a second video stream converted from a second format to the first format, the second video stream being a previous speaker stream, wherein the translator structure is shared between the previous speaker stream and the current speaker stream by a component associated with the previous speaker stream inserting a first I-frame request in an ingress stream to the translator structure when a video switch occurs from the previous speaker stream to the current speaker stream, and wherein the translator generates a second I-frame request as a response to the first I-frame request, and wherein the previous speaker stream is associated with an H.263 protocol and the current speaker stream is associated with an H.264 protocol, and wherein a unicast protocol is used to communicate the previous speaker stream, which undergoes a conversion between a codec H.264 format and a codec H.263 format, to an endpoint associated with a current speaker of a video conferences, wherein, when more than two participants are participating in a video conference, the previous speaker stream is to be displayed to a participant in the video conference while the participant is the current speaker and the current speaker stream is displayed to all other participants in the video conference when not the current speaker.

11. The method of claim 10, further comprising configuring a router using software to form the media switch.

12. The method of claim 10, wherein the first and second stream groups have a different encoder/decoder (codec) format characteristic.

13. The method of claim 10, wherein the first and second stream groups have a different bit rate characteristic.

14. The method of claim 10, wherein the first and second stream groups have a different picture resolution characteristic.

15. The method of claim 10, wherein the first and second stream groups have a different transportation carrying protocol characteristic.

16. The method of claim 10, further comprising configuring the translator structure as a logical endpoint.

* * * * *